United States Patent [19]

Suda et al.

[11] Patent Number: 4,745,426
[45] Date of Patent: May 17, 1988

[54] LIGHT MEASURING DEVICE FOR A CAMERA

[75] Inventors: Yasuo Suda; Akira Ishizaki, both of Kanagawa, Japan

[73] Assignee: Canon Kabushiki Kaisha, Tokyo, Japan

[21] Appl. No.: 913,259

[22] Filed: Sep. 30, 1986

[30] Foreign Application Priority Data

Oct. 4, 1985 [JP] Japan ................................ 60-220250
Oct. 4, 1985 [JP] Japan ................................ 60-220251

[51] Int. Cl.⁴ ............................ G03B 3/00; G03B 7/099
[52] U.S. Cl. ................................ 354/407; 354/406; 354/476
[58] Field of Search ............... 354/406, 407, 429, 432, 354/476, 477, 478, 479

[56] References Cited

U.S. PATENT DOCUMENTS 4,526,458 7/1985 Kawamura et al. ................ 354/406
4,531,835 7/1985 Oinoue .................................. 354/406

FOREIGN PATENT DOCUMENTS

0810459 7/1974 Belgium .............................. 354/476
0032031 2/1985 Japan .................................. 354/476

Primary Examiner—Russell E. Adams
Attorney, Agent, or Firm—Fitzpatrick, Cella Harper & Scinto

[57] ABSTRACT

A light measuring apparatus for an exposure control for a camera including a photoelectric converter which photoelectrically converts a portion of a light beam impinging on a photoelectric conversion portion of a focus detection device, through a taking lens. The remainder of the light beam is transmitted into the optical path of the light beam so that light measuring for an exposure control is performed from the bundle of light proceeding toward the focus detection device.

6 Claims, 9 Drawing Sheets

LIGHT MEASURING DEVICE FOR A CAMERA

BACKGROUND OF THE INVENTION

1. Field of the Invention

The present invention relates to a light measuring device, and more particularly to a light measuring device for an exposure control device.

2. Description of the Related Art

Heretofore, as a light measuring device for a single lens reflex camera, a device which leads a bundle of light to a photoelectric conversion part by such a beam splitting member as for example, a micro beam splitter formed at a condenser lens of a viewfinder optical system, or a device which leads the bundle of light to a photoelectric conversion part through a secondary imaging lens provided at a bundle of light exit plane of a pentagonal prism, etc., have been proposed.

However, devices mentioned above have problems. For example, many steps are necessary for adjusting the sensitivity of the distribution of the quantity of light at a field of view of a viewfinder and for adjusting the distribution of light measuring sensitivity of a split image prism on a focusing screen.

Figure 5:
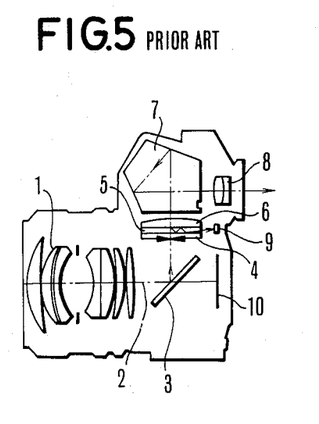
FIG. 5 is a cross sectional view to show an example of prior art.
Figure 6:
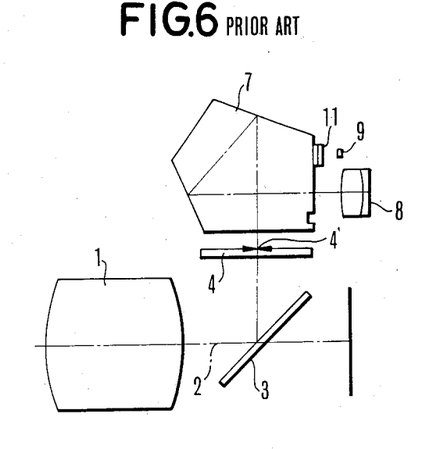
FIG. 6 is a cross sectional view to show another example of prior art.
Figure 7:
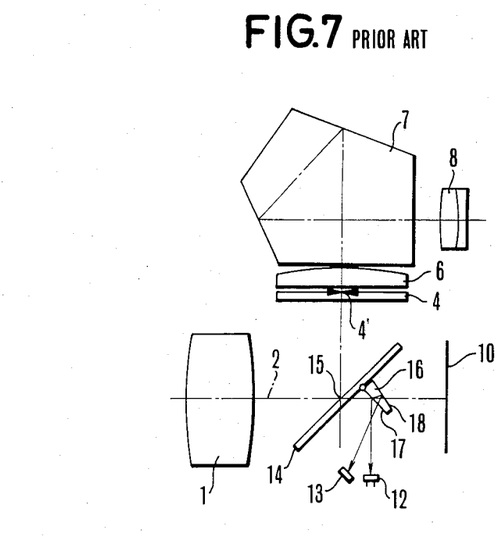
FIG. 7 is a cross sectional view to show still another example of prior art.

FIGS. 5, 6 and 7 are cross-sectional views for a single lens reflex camera showing an example of prior art, wherein the same components are identified with the same numbers.

In FIG. 5, the light beam from an object (the optical axis of which is shown by one dot chain line 2) passing through a taking lens 1 is reflected upwards by a mirror 3 and comes to an eye piece lens 8 through a focusing screen 4, a beam splitting member 5, a condenser lens 6 and a pentagonal prism 7, while the bundle of light split by the beam splitting member 5 impinges on a photoelectric conversion part 9. 10 denotes a film plane. In this system when an object is viewed by the eye piece lens 8 a portion of light beam reaching the eye piece lens 8 appears to be missing because of the splitting of the light beam by the beam splitting member 5, thereby generating a shadow with a clear contour at a central part of a viewfinder.

In FIG. 6, the light beam from the object penetrating the taking lens 1 is reflected by the mirror 3 and proceeds through the focusing screen 4, then has its direction changed by the pentagonal prism 7 and reaches the eye piece lens 8. Also, the central part of the focusing screen 4 provides an image to the photoelectric conversion part 9 by a secondary imaging lens 11 provided at the light exit plane of the pentagonal prism 7. In this system, a shadow will not be generated at the central part of the viewfinder, being different from the example shown in FIG. 5, but many steps of work will be needed for adjusting the means for forming an image of the central part of the focusing screen 4 at a center of the photoelectric conversion part 9. Further, since the bundle of light after passing through the focusing screen 4 is measured, there is the shortcoming that the distribution of light measuring sensitivity is influenced by the split image prism 4', etc. of the focusing screen 4; also there is the problem that the focusing screen 4 can not be freely exchanged.

Also, FIG. 7 shows an example in which a photoelectric conversion part 12 of a light measuring device and a photoelectric conversion part 13 of a focus detection device are respectively positioned at a bottom part of a mirror box, wherein a half-reflection part 15 is formed at a central part of a main mirror 14 and a beam splitting mirror 16 is provided at a rear part of the same. The beam splitting mirror 16 has a half-reflection plane 17 formed at an object side and a total-reflection plane 18 formed at the film plane 10 side thereof. The bundle of light from an object is, after passing through the taking lens 1, split into two directions by the main mirror 14 and one of the thus split bundle of light is reflected toward the focusing screen 4 and is used for an observation of a photo-taking field of view. A portion of the other split bundle of light passing through the main mirror 14 is reflected by the half-reflection plane 17 at the object side and then impinges on the photoelectric conversion part 12 of the light measuring device, while the remaining portion of the bundle of light is reflected by the total-reflection plane 18 at the film plane 10 side and impinges into the photoelectric conversion part 13 of the focus detection device.

When the photoelectric conversion part 12 of the light measuring device is so positioned as mentioned above, a light measuring zone only within a viewfinder will not becomes awkwardly dark or the distribution of the light measuring sensitivity will not be influenced by the split image prism 4' of the focusing screen 4.

However, it is difficult to secure a housing space for the photoelectric conversion part 12 of the light measuring device and the photoelectric conversion part 13 of the focus detection device at the bottom part of the mirror box. Further the half-reflection plane 17 and the total-reflection plane 18 are formed at the beam splitting mirror 16. Therefore, there is a problem that the beam splitting mirror 16 becomes large.

SUMMARY OF THE INVENTION

An object of the present invention is to provide a light measuring device for a camera, which solves the above-mentioned problems and can easily position the photoelectric conversion means, can reduce the cost and enhance the visibility of a viewfinder, and at the same time can stabilize the distribution of light measuring sensitivity.

In order to achieve the above-mentioned object, a light measuring device for a camera in the present invention has photoelectric conversion means, which photoelectrically converts a portion of a light beam impinging on a photoelectric conversion part of a focus detection device through a taking lens and passes the remainder of this light beam, inserted within an optical part of this light beam, so that light measuring for an exposure control is made by the bundle of light proceeding towards the focus detection device.

Other objects and features of the present invention will become apparent from the following detailed description of the preferred embodiments thereof with reference to the accompanying drawings.

DETAILED DESCRIPTION OF THE PREFERRED EMBODIMENTS

Figure 1:
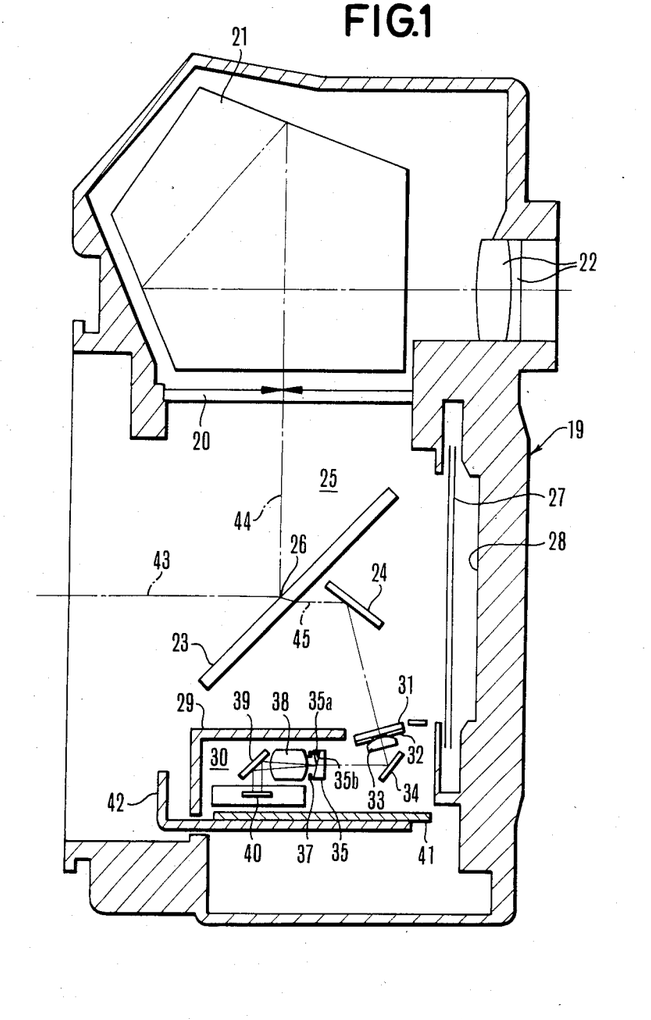
FIG. 1 is a cross sectional view of a single lens reflex camera having an embodiment of the present invention.

FIG. 1 is a cross sectional view of a single lens reflex camera showing an embodiment of the present invention.

Above a body 19, a focusing screen 20, a pentagonal prism 21, and an eye piece lens 22 are positioned, thus forming a viewfinder optical system.

At the inside of the body 19, a mirror box internal space 25 is formed to have a mirror 23 and a sub-mirror 24 positioned therein in a retractable manner, and a half-reflection part 26 is provided at a center of the main mirror 23. What is shown as 27 is a shutter and 28 denotes a film plane.

A space 30 which is covered by a mirror box bottom part 29 is formed below the mirror box internal space 25, and a light measuring device 31 for an exposure control, a field of view mask 32, a field lens 33, a mirror 34, an image separating prism 35, a diaphragm 37, a re-imaging lens 38, a mirror 39, and a CCD sensor 40 which constitutes a photoelectric conversion part for a focus detection device are provided therein.

The light measuring device 31 includes an interference filter and a glass substrate (to be described below) besides a photoelectric conversion part (to be described below), wherein the photoelectric conversion part is so arranged as to be positioned in the vicinity of a proposed imaging plane of a taking lens (not shown). And the re-imaging lens 38 is so arranged that the light beam passing through the field of view mask 32 is imaged on the CCD sensor 40. As the CCD sensor 40, for example, one having 40 picture elements and two lines is used. What is shown as 41 is an automatic diaphragm base plate, and 42 is an automatic diaphragm lever. What are shown as 43, 44 and 45 by one dot chain line are optical axes.

Concerning the light measuring device 31, explanations shall be made later by referring to FIG. 2 and FIG. 3.

In FIG. 1, the light beam passing through a taking lens (not shown) (the optical axis 43) is split by the main mirror 23 into the reflective light (optical axis 44) to a viewfinder optical system and the penetrating light (optical axis 45) to light measuring and focus detection systems. This penetrating light is further reflected by the sub-mirror 24 and is led to the light measuring device 31.

A portion of the light beam led to the light measuring device 31 is converted by a photoelectric conversion part to be described later to electric power for an exposure control. That is, the light measuring device 31 produces an electric signal for exposure control and corresponds to the intensity of incident light from an object.

Also, the light passing through the field of view mask 32 is made to enter into the image separating prism 35 by the field lens 33 and the mirror 34, and is separated into two images by the image separating prism 35. The image separating prism 35 has different oblique parts 35a, 35b formed thereon and a projection is made by the field lens 33 onto an exit pupil of a taking lens (not shown). Therefore, two images separated by the image separating prism 35 have respective bundles of light penetrating respectively different zones on the exit pupil of the taking lens impinging into corresponding lines (not shown) at the CCD sensor 40 through the re-imaging lens 38 and the mirror 39. Therefore, an optical system from the field lens 33 to the CCD sensor 40 functions as a focus detection system of a known phase difference detection type, wherein the amount of defocusing of the taking lens is computed by detecting the difference in phase of the distribution of quantity of light within the image at the field of view mask 32.

Figure 2:
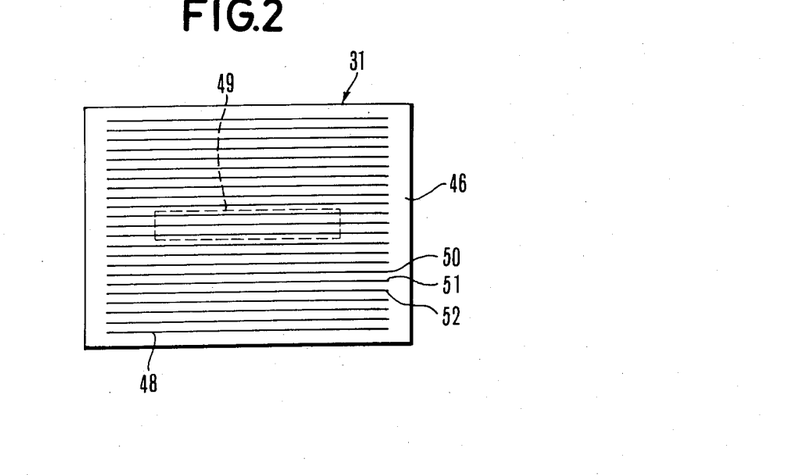
FIG. 2 is a front elevation to show an embodiment of the present invention.
Figure 3:
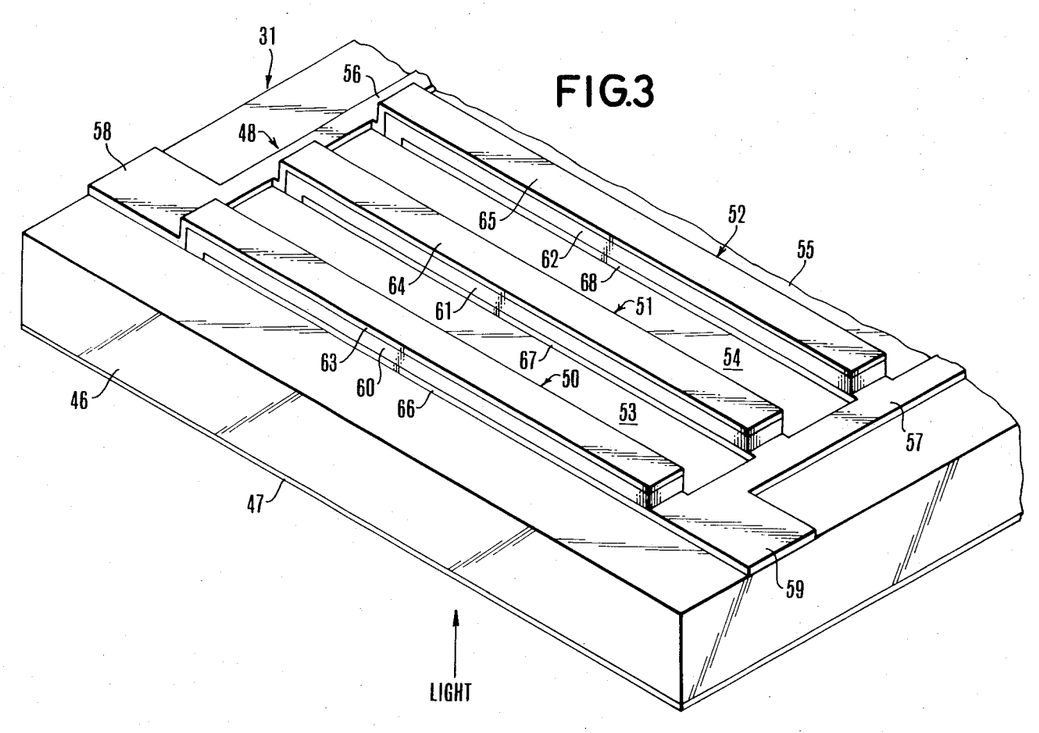
FIG. 3 is an oblique view to show details of an embodiment of the present invention.

FIG. 2 is a front elevation of the light measuring device 31, and FIG. 3 is an oblique view to show details of the same light measuring device 31.

The light measuring device 31 is made of an interference filter 47 and a photoelectric conversion part 48 positioned at front and reverse sides of a glass substrate 46. What is shown as 49 by broken line is an opening of the field of view mask 32 (FIG. 1).

The photoelectric conversion part 48 is made of amorphous silicon light receiving elements 50, 51, 52 and light penetrating parts 53, 54, 55 arranged in linear shape, as well as connecting parts 56, 57 respectively connecting the amorphous silicon light receiving elements 50, 51, 52, wherein the connecting parts 56, 57 are connected to a logarithmic compression circuit (to be described later) by connecting terminals 58, 59.

The amorphous silicon light receiving elements 50, 51, 52 are made of amorphous silicon layers 60, 61, 62, formed linearly and upper electrodes 63, 64, 65 and lower electrodes 66, 67, 68 which are laminated and positioned vertically.

Figure 4:
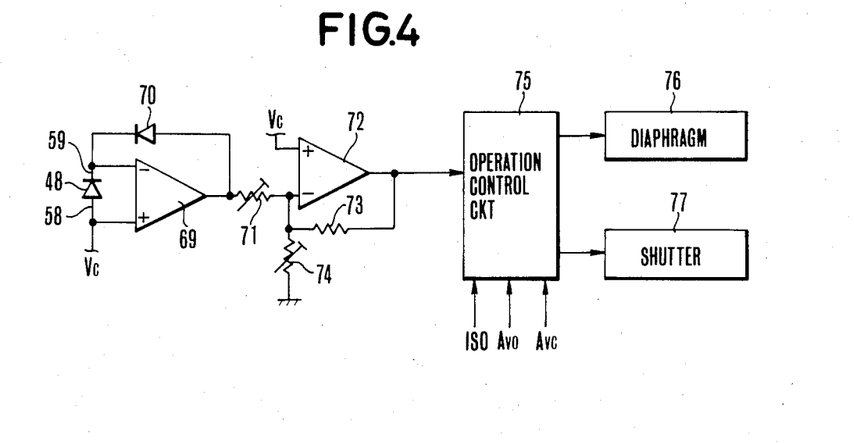
FIG. 4 is a circuit diagram of a circuit connected to a photoelectric conversion part according to the present invention.

FIG. 4 shows an example of a diagram of a circuit connected to the photoelectric conversion part 48 shown in FIG. 2 and FIG. 3.

The connecting terminal 58 of the photoelectric conversion part 48 is connected to power source $V_C$ having a reference voltage and a non-inverting input end of an operational amplifier 69, and the connecting terminal 59 is connected to an inverting input end. A feedback loop having a logarithmic compression diode 70 is connected between an output end and the inverting input end of the operational amplifier 69, and a logarithmic compression circuit is formed by the logarithmic compression diode 70 and the operational amplifier 69.

An output end of the operational amplifier 69 is connected to an inverting input end of an operational amplifier 72 through a variable resistance 71. This inverting input end is connected to a feedback loop having a resistance 73 and at the same time is grounded through a variable resistance 74. A power source $V_c$ is connected to a non-inverting input end of the operational amplifier 72. The operational amplifier 72 and resistances 71, 73, 74 constitute an inverting amplification circuit.

An output end of the operational amplifier 72 is connected to an operational control circuit 75 into which film sensitivity information ISO, fully opened aperture information $A_{VO}$ of a taking lens and fully opened aperture correction information $A_{VC}$ are respectively introduced.

This operational control circuit 75 is so connected as controlling an aperture control device 76 and a shutter speed control device 77.

Now, the operation of the device shall be explained by referring to FIG. 1, FIG. 2, FIG. 3 and FIG. 4.

When a portion of light beam passing through the light measuring device 31 is received by the amorphous silicon light receiving elements 50, 51, 52, a photoelectric conversion is made and a current is generated. This generated current is logarithmically compressed by the logarithmic compression circuit to such a current that is proportional to the logarithm of the quantity of light received and is invertedly amplified by the inverting amplification circuit and is introduced into the operational control circuit 75.

At the operational control circuit 75, an aperture value of a taking lens and a shutter speed are computed and determined by information from the inverting amplification circuit, film sensitivity information ISO, fully opened aperture information $A_{VO}$, and fully opened aperture correction information $A_{VC}$; this controls the aperture control device 76 and the shutter speed control device 77.

In the embodiment shown in FIG. 1, FIG. 2 and FIG. 3, an optical system of a focus detection device is housed in the space 30 formed by the mirror box bottom part 29 of the body 19, and the light measuring device 31 which is integrally made of the glass substrate 46, the sensitivity correcting interference filter 47 and the photoelectric conversion part 48, is provided within the optical path leading from the sub-mirror 24 to the optical system of the focus detection device. Therefore it is not necessary to provide an interference filter for the light measuring device 31 anew.

Such an imaging optical system for light measuring as a secondary imaging lens for the light measuring device 31 and a beam splitter member is not necessary. Further, the sub-mirror 24 may be used in common for light measuring and focus detection, thus reducing the cost.

Also, this omission of the secondary imaging lens or the beam splitter member eliminates the necessity for position matching of the imaging optical system for light measuring and the light receiving element for light measuring. Therefore, the adjusting means for distribution of light measuring sensitivity, which has required many steps in prior art, can be eliminated.

And, since the bundle of light from the taking lens is split by the main mirror 23, a partial drop in the quantity of light within a field of view of a viewfinder will not take place; also, as the split image prism does not at all influence the distribution of light measuring sensitivity, the focusing screen 20 can be freely exchanged.

Also, amorphous silicon light receiving elements 50, 51, 52 of linear shape are arranged in the shape of a blind screen at a beam exit side of the glass substrate 46, and the interference filter 47 for light measuring and for focus detection is provided at a beam incident side, so that the spectral sensitivity is corrected. Therefore, a single glass substrate 46 can be used. Also a light receiving area of the light measuring device 31 can be made large for securing better efficiency.

In the embodiment shown in the drawings, the amorphous silicon light receiving elements 50, 51, 52 of linear shape are used, but light receiving elements of other material may be used, and light receiving elements of granular shape may be spottedly arranged instead of the linear shape. Also, other structures than the light measuring device 31 are not limited to those shown in the drawings.

Next, explanations shall be provided of the focus detection device in the embodiment shown in FIG. 1.

Figure 8:
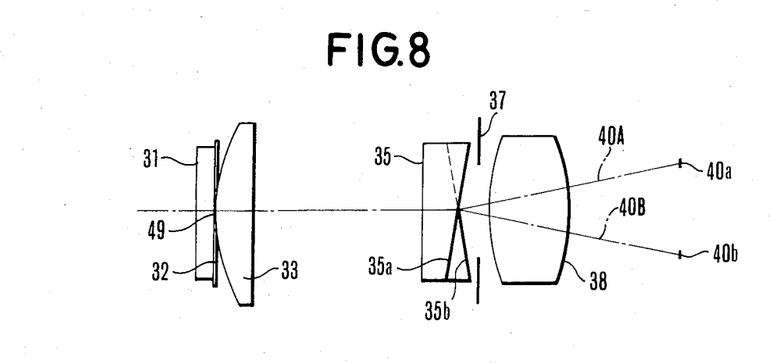
FIG. 8 is a cross sectional view to explain a focus detection device in the embodiment shown in FIG. 1.
Figure 9:
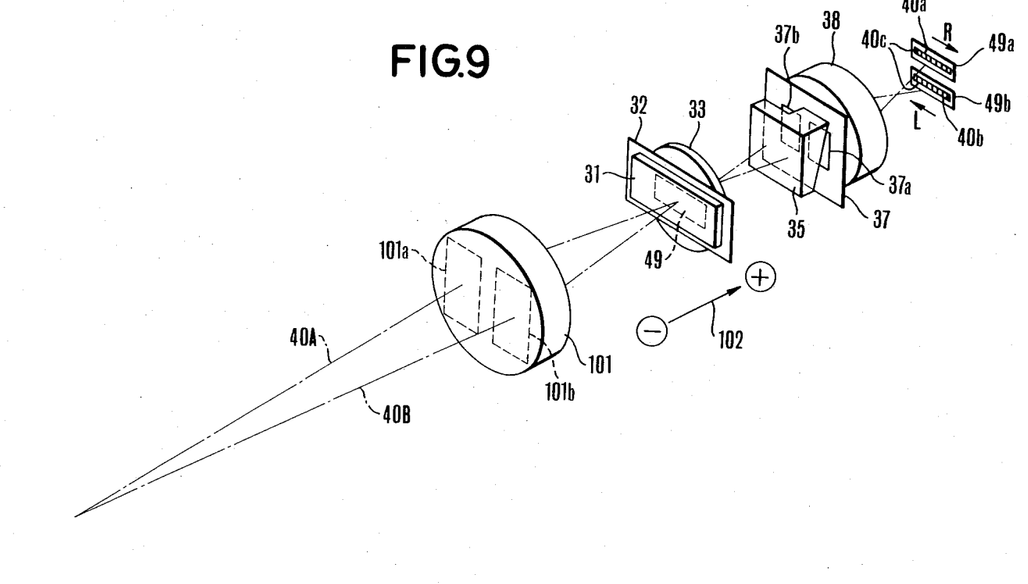
FIG. 9 is an oblique view of the focus detection device shown in FIG. 8.

FIG. 8 is a cross sectional view for explaining a focus detection device in the embodiment shown in FIG. 1, and FIG. 9 is an oblique view thereof. Components having the same function as that in FIG. 1 are identified with the same numbers and marks. In FIG. 8 and FIG. 9, the light measuring device 31 and the field-lens 33 are positioned together with the field of view mask 32 in the vicinity of a proposed imaging plane of a taking lens 101. In the field of view mask 32, and opening 49 is provided, and an image of this opening 49 is separated into two images by the image separating prism 35 having two oblique planes 35a, 35b, and thus separated images pass through passing parts 37a, 37b, respectively of the diaphragm 37 and are projected as images 49a, 49b on the CCD sensors 40a, 40b of two lines, which constitute a photoelectric conversion part of the focus detection device by the re-imaging lens 38. Therefore, at the CCD sensors 40a, 40b, the light beam passing through a zone 101a of the taking lens 101 is received by the CCD sensor 40a while the light beam passing through a zone 101b is received by the CCD sensor 40b, respectively. At the CCD sensors 40a, 40b, picture elements 40c are respectively arranged in a prescribed direction. What are shown as 40A, 40B by one dot chain line are optical axes of the passing light beam.

In a focus detection device mentioned above, when an imaging position of an object by the taking lens 101 moves in the direction of (+) of an arrow 102 from a proposed imaging plane, the image 49a projected on the CCD sensor 40a is moved in the direction of R and the image 49b projected on the CCD sensor 40b is moved in the direction of L. Also, when the imaging position of the taking lens 101 moves in the direction of (−) of the arrow 102, the two images 49a, 49b on the CCD sensors 40a, 40b are moved respectively in the reverse direction to the above-mentioned arrows R and L.

This movement of the two images 49a, 49b on the CCD sensors 40a, 40b is detected as a phase difference of photoelectric conversion outputs, and a defocusing amount of the taking lens 101 is computed by an operating circuit.

The phase difference can be obtained, for example, by the alogarithm shown below. That is, photoelectric conversion outputs at each picture element 40c of the CCD sensors 40a, 40b are defined respectively as N pieces of image signals of the A image {a(1), a(2) . . . a(N)}, and the B image {b(1), b(2) . . . b(N)}, and a correlation amount Pk of the A image, and the B image are defined as:

$$Pk = \begin{cases} \sum_{i=1}^{n} |b(i + |k|) - a(i)| & (k < 0) \quad (1) \\ \sum_{i=1}^{n} |b(i) - a(i + k)| & (k \geq 0) \quad (1A) \end{cases}$$

(Herein, $n = N - |k|$, $-N/2 \leq k \leq N/2$).

In the formula (1), (1A), the correlation value Pk is used to compute the coincidence of the A image, and the B image by changing the phase, and the k which makes the correlation amount Pk the minimum corresponds to the above-mentioned phase difference. Therefore, when the computations of the formula (1), (1A) are done and the phase difference is obtained, an in-focus state of the taking lens 101 will be obtained.

Figure 10A:
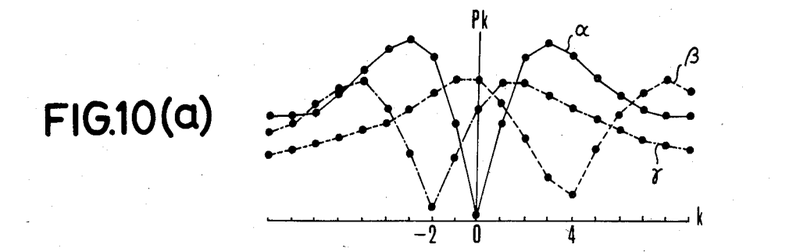
FIGS. 10(a) to 10(d) are property line diagrams showing function values for detecting the photoelectric conversion outputs and phase differences of a focus detection device.
Figure 10B:
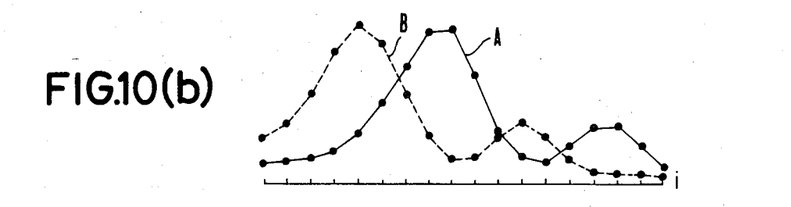
Figure 10C:
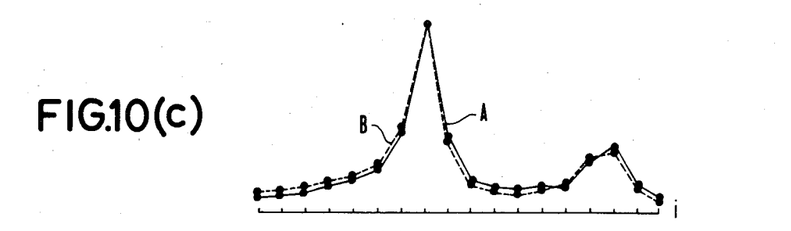
Figure 10D:
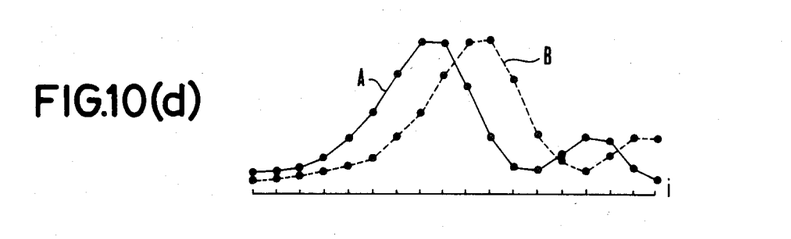

FIG. 10(a) shows the above-mentioned correlation amount Pk, and FIG. 10(b), FIG. 10(c) and FIG. 10(d) show examples of the image signals of the A image and B image at that time, respectively.

That is, FIG. 10(c) shows image signals at the time of an in-focus state, and the correlation amount Pk thereof is $\alpha$ in FIG. 10(a). Similarly, the correlation amount Pk corresponding to the image signal at a time of a non-state of FIG. 10(b) is $\beta$ of FIG. 10(a). Also, the correlation amount Pk corresponding to the image signal at a time of a non-state of FIG. 10(d) corresponds to $\gamma$ of FIG. 10(a). And respective phase differences are $k=0$ in $\alpha$, $k=4$ in $\beta$, $k=-2$ in $\gamma$.

As has been explained above, when there is no eclipse of the light beam in the focus detection optical system, a correct focus detection can be made, but when a light measuring device for an exposure control is inserted in the optical path of a focus detection system, the light beam from the field lens 33 to the CCD sensors 40a, 40b are eclipsed by the photoelectric conversion means of the light measuring device 31 provided at the opening 49 of the field of view mask 32, and as a result the following phenomenon takes place.

Figure 11:
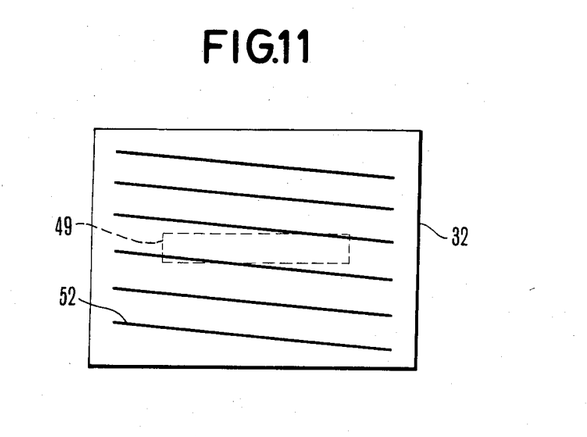
FIG. 11 is a front elevation to show an example of the disposition of amorphous silicon light receiving elements.
Figure 12A:
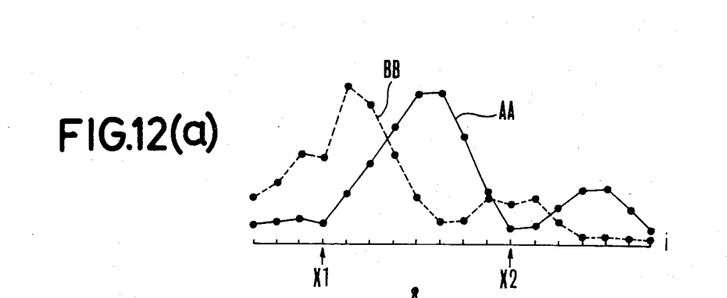
FIGS. 12(a) to 12(c) are property line diagrams to show function values for detecting the photoelectric conversion outputs and phase difference of the focus detection device with a disposition example shown in FIG. 11.
Figure 12B:
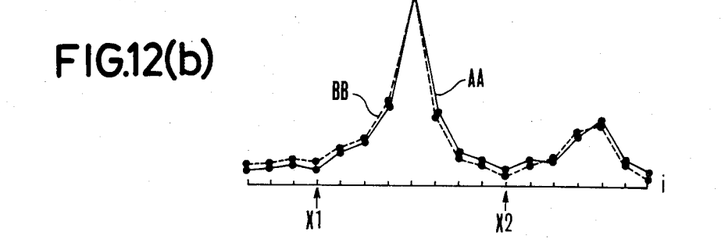
Figure 12C:
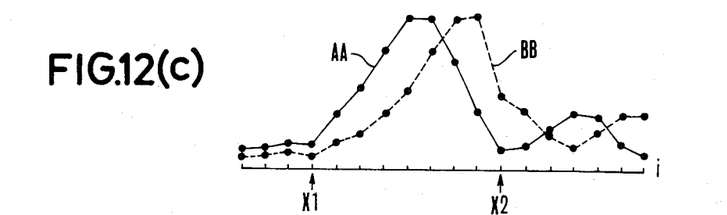

FIG. 11 shows an example of an arrangement of such amorphous silicon light receiving elements as shown in FIG. 2 used in a photoelectric conversion means, and FIG. 12(a), FIG. 12(b) and FIG. 12(c) show image signals of the AA image and the BB image in the example shown by FIG. 11. Here, the AA image and BB image are of the same object for the A image and the B image of FIG. 10.

As shown in FIG. 11, when the amorphous silicon light receiving elements 52 provided at the opening 49 of the field of view mask 32 are positioned at an incline with respect to the direction in which each picture element 40c of the CCD sensors 40a, 40b is oriented, the ratio of the amount of eclipse for each picture element 40c varies with the eclipse of the light beam passing through the field of view mask 32, and image signals of the AA image and the BB image shown by FIG. 12(a), FIG. 12(b) and FIG. 12(c). That is, the output of the photoelectric conversion of the picture elements shown by arrow marks, x1, x2 becomes lower to a level of about ⅔ of that when the eclipse is not made. Therefore, there is a sufficient problem that it becomes impossible to detect the genuine phase difference from FIG. 12(a) and FIG. 12(c) showing a non-in-focus state and to obtain the phase difference by making a computation using the above-mentioned formula (1), (1A); thus the accuracy in focus detection becomes remarkably lower.

Figure 13:
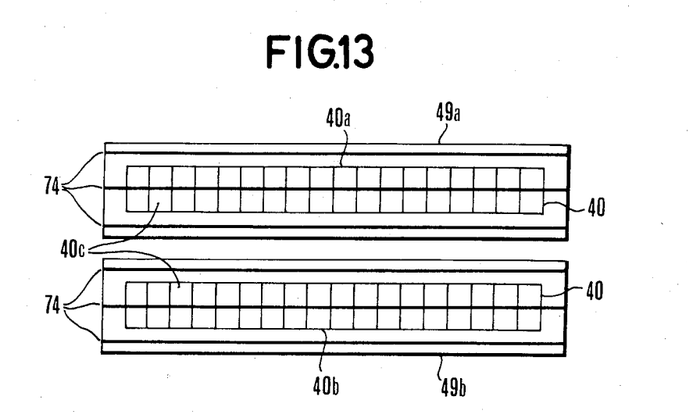
FIG. 13 is a drawing showing the positional relationship of CCD sensors and amorphous silicon light receiving elements in another embodiment of the present invention.

An embodiment shown in FIG. 13 discloses a light measuring device for a camera in which the above-mentioned problem is solved and the accuracy of in focus detection will not be lowered.

FIG. 13 is a front elevation of a CCD sensor 40 of a focus detection device in a single lens reflex camera according to another embodiment of the present invention. An arrangement of this single lens reflex camera is the same as that in FIG. 1 and an arrangement of the light measuring device is the same as that in FIG. 2 and FIG. 3, while an arrangement of an exposure control electric circuit is the same as that in FIG. 4; thus their explanations are omitted.

In a camera shown in FIG. 13, the direction of the amorphous silicon light receiving elements 50, 51, 52 constituting the photoelectric conversion part 48 (refer to FIG. 2) of the light measuring device 31 is so arranged to form parallel straight line groups to coincide with the direction of the array of picture elements (to be described later) of the CCD sensor 40 of the focus detection device.

The CCD sensor 40 consists of an upper picture element array 40a and a lower picture element array 40b, and is so made that such photoelectric conversion output as corresponding to the quantity of light received can be obtained in each one of picture elements 40c. What are shown as 49a, 49b are images of the opening 49 (FIG. 2), and 74 denote images of the amorphous silicon light receiving elements 50, 51, 52 (refer to FIG. 2, FIG. 3) respectively projected on the picture element arrays 40a, 40b.

Now, the operation of the embodiment shall be explained by referring to FIG. 1, FIG. 2, FIG. 3, FIG. 4 and FIG. 13.

When a portion of a light beam passing through the light measuring device 31 is received by the amorphous silicon light receiving elements 50, 51, 52, it is photoelectrically converted and current is generated. Thus generated current is logarithmically compressed by a logarithmic compression circuit to such current proportional to the logarithm of the quantity of light received, and is invertedly amplified by the inverting amplification circuit, and then is introduced into the operation control circuit 75.

In the operation control circuit 75, the aperture value of the taking lens and the shutter speed are computed and determined by the information of the above-mentioned inverting amplification circuit, the film sensitivity information ISO, the fully opened aperture information $A_{VO}$, and the fully opened aperture correction information $A_{VC}$, and the aperture control device 76, and the shutter speed control device 77 are controlled in a similar manner as in the first embodiment. On the other hand, the light beam passing through the light penetrating parts 53, 54, 55 of the light measuring device 31 projects the images of the opening 49 and the amorphous silicon light receiving elements 50, 51, 52 respectively onto the upper and lower picture element arrays 40a, 40b of the CCD sensor 40 through the field lens 33, the mirror 34, the image separating prism 35, the re-imaging lens 38 and the mirror 39.

The images 74 of the amorphous silicon light receiving elements 50, 51, 52 projected as mentioned above are uniformly distributed on each picture element 40c; therefore, there will be no partial eclipse or unevenness generated in the quantity of light received.

Therefore, the photoelectric conversion output at each picture element 40c will be such as to be able to obtain the phase difference as shown in the example of FIG. 10; thus a focus detection can be made in a correct manner.

While amorphous silicon light receiving elements 50, 51, 52 of linear shape are used in the embodiment shown in the drawing, light receiving elements of other type of material may be used. Also, instead of having a linear shape, light receiving elements of granular shape may be spottedly provided. Also the structure of parts other than the light measuring device 31 is not limited to that shown in the embodiment of the drawing.

As has been explained above, according to the present invention, photoelectric conversion means, which photoelectrically converts a portion of light beam impinging on a photoelectric conversion part of a focus detection device through a taking lens and passes the remaining light beam, is inserted in the optical path of the above-mentioned light beam, so that light measuring for an exposure control is made from the bundle of light proceeding towards the focus detection device; therefore, a positioning of the photoelectric conversion means can be made easily and the cost can be reduced. Further, the visibility in a viewfinder may be enhanced and at the same time a distirution of light measuring sensitivity can be stabilized.

While a specific embodiment of the invention has been shown and described in detail to illustrate the application of the inventive principles, it will be understood that the invention may be embodied otherwise without departing from such principles.

What is claimed is:

1. A light measuring apparatus for a camera, comprising:
   (a) first light sensitive means for producing an electrical signal for focus detection in response to the illumination thereof; and
   (b) second light sensitive means, positioned in the vicinity of an imaging plane of a taking lens, for converting a portion of a light beam passing through the taking lens into an electrical signal, and for permitting the remainder of the light beam to pass therethrough, wherein said second light sensitive means is positioned with respect to said first light sensitive means such that the remainder of the light beam illuminates said first light sensitive means, wherein said second light sensitive means comprises a plurality of light sensitive elements, wherein a portion of said plurality of elements blocks the light beam passing through the taking lens which would otherwise pass through said second light sensitive means and illuminate said first light sensitive means, and wherein the direction in which said first light sensitive means is oriented substantially coincides with the direction in which said plurality of light sensitive elements are oriented so as to uniformly distribute the remainder of the light beam on the first light sensitive means.

2. A light measuring apparatus according to claim 1, wherein said light sensitive elements are amorphous silicon light receiving elements.

3. A light measuring apparatus according to claim 1, wherein said light sensitive elements have photoelectric conversion parts which are separated from each other and are oriented parallel to each other.

4. A light measuring apparatus according to claim 3, wherein said comprise photoelectric conversion parts amorphous silicon light receiving elements.

5. A single lens reflex camera, comprising:
   (a) a taking lens;
   (b) a focus detecting means comprising two electrical sensors for producing electrical signals in response to receiving an image of an object formed by light from said object passing through said taking lens, wherein said focus detecting means controls the focus condition of the taking lens in accordance with the correlation value associated with the object image and the output from said two electrical sensors; and
   (c) light sensitive means positioned in the vicinity of an imaging plane of said taking lens, for converting a portion of a light beam passing through said taking lens into an electrical signal, for controlling an exposure value of said camera, and for permitting the remainder of the light beam to pass therethrough, wherein said light sensitive means is positioned relative to said focus detecting means such that the remainder of the light beam illuminates said two electrical sensors to control the focus state of said taking lens, wherein said light sensitive means comprises a plurality of light sensitive elements, wherein a portion of said plurality of elements block the light beam passing through said taking leans which would otherwise pass through said light sensitive means and illuminate said two electrical sensors, and wherein the direction in which said two electrical sensors are oriented substantially coincides with the direction in which said plurality of light sensitive elements are oriented so as to uniformly distribute the remainder of the light beam on the light sensitive means.

6. A single lens reflex camera according to claim 5, wherein each sensor comprises a CCD sensor.

* * * * *

UNITED STATES PATENT AND TRADEMARK OFFICE
CERTIFICATE OF CORRECTION

PATENT NO. : 4,745,426

DATED : May 17, 1988

INVENTOR(S) : Yasuo Suda, et al.

It is certified that error appears in the above-identified patent and that said Letters Patent is hereby corrected as shown below:

COLUMN 1

Line 32, "eye piece" should read --eyepiece--;
Line 37, "eye piece" should read --eyepiece--;
Line 38, "eye piece" should read --eyepiece--;
Line 47, "eye piece" should read --eyepiece--; and
Line 53, "of work" should be deleted.

COLUMN 2

Line 7, "bundle" should read --bundles--;
Line 16, "into" should read --on--;
Line 21, "becomes" should read --become--;
Line 28, "Further" should read --Further,--;
Line 58, "cross sectional" should read --cross-sectional--; and
Line 67, "cross sectional" should read --cross-sectional--.

COLUMN 3

Line 1, "cross sectional" should read --cross-sectional--;
Line 3, "cross sectional" should read --cross-sectional--;

UNITED STATES PATENT AND TRADEMARK OFFICE
CERTIFICATE OF CORRECTION

PATENT NO. : 4,745,426                Page 2 of 3
DATED : May 17, 1988
INVENTOR(S) : Yasuo Suda, et al.

It is certified that error appears in the above-identified patent and that said Letters Patent is hereby corrected as shown below:

Line 5, "cross sectional" should read --cross-sectional--;
    Line 28, "cross sectional" should read --cross-sectional--; and
    Line 32, "eye piece" should read --eyepiece--.

COLUMN 4

Line 22, "into" should read --on--; and
    Line 49, "linearly" should read --linearly, --.

COLUMN 6

Line 17, "cross sectional" should read --cross-sectional--;
    Line 25, "and" should read --an--; and
    Line 61, "alogarithm" should read --algorithm--.

COLUMN 7

Line 24, "non-" should read --non-in-focus--; and
    Line 27, "non-state" should read --non-in-focus state--.

UNITED STATES PATENT AND TRADEMARK OFFICE
CERTIFICATE OF CORRECTION

PATENT NO. : 4,745,426

DATED : May 17, 1988

INVENTOR(S) : Yasuo Suda, et al.

It is certified that error appears in the above-identified patent and that said Letters Patent is hereby corrected as shown below:

COLUMN 8

```
Line 1,  "in focus" should read --in-focus--;
Line 30, "the embodiment" should read
         --this embodiment--; and
Line 36, "Thus" should read --This--.
```

COLUMN 9

```
Line 23, "distirution" should read
         --distribution--.
```

COLUMN 10

```
Line 14, "comprise photoelectric
         conversion parts" should read
         --photoelectric conversion
         parts comprise--.
```

Signed and Sealed this

Fourteenth Day of March, 1989

Attest:

DONALD J. QUIGG

Attesting Officer

Commissioner of Patents and Trademarks